(No Model.)
D. L. REAGAN.
TRACTION WHEEL.
No. 559,866. Patented May 12, 1896.
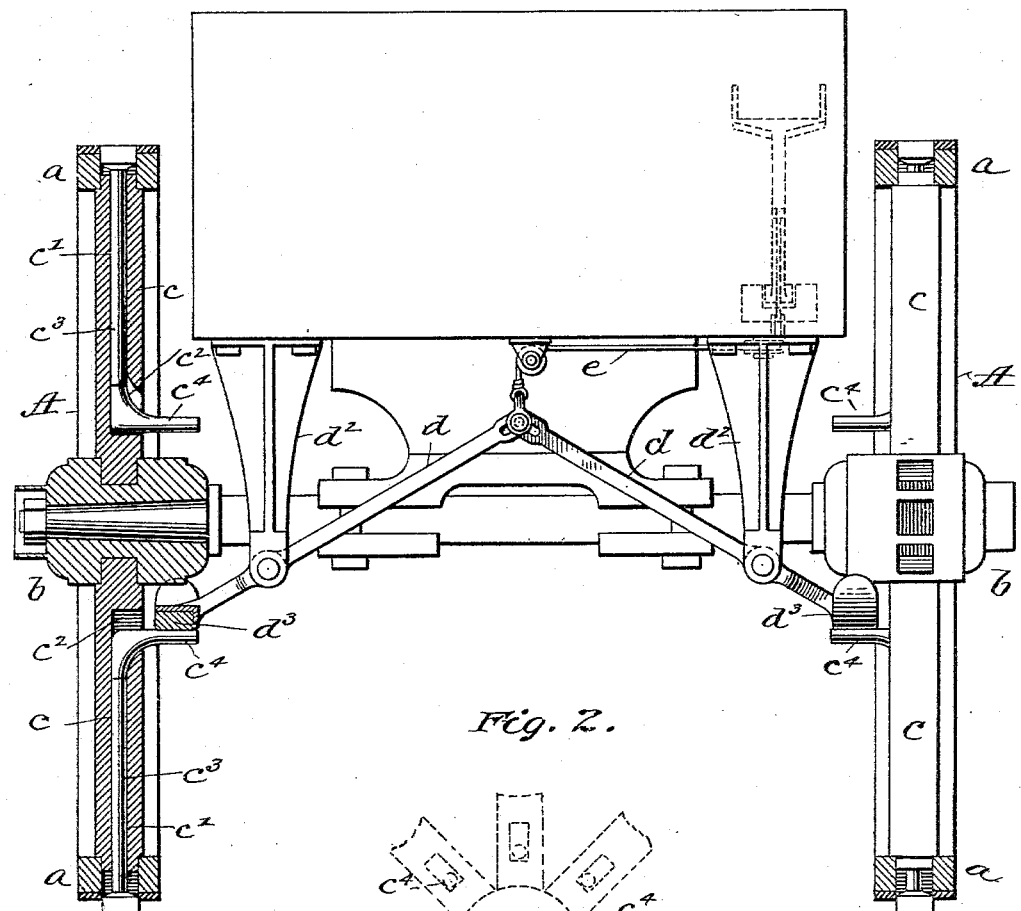
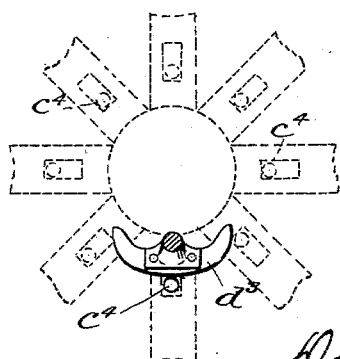
WITNESSES:
Frank S. Ober
John Kraeger
INVENTOR
Daniel L. Reagan
BY
ATTORNEY

UNITED STATES PATENT OFFICE.

DANIEL LAWRENCE REAGAN, OF BOSTON, MASSACHUSETTS.

TRACTION-WHEEL.

SPECIFICATION forming part of Letters Patent No. 559,866, dated May 12, 1896.

Application filed October 30, 1895. Serial No. 567,372. (No model.)

*To all whom it may concern:*

Be it known that I, DANIEL LAWRENCE REAGAN, a citizen of the United States, residing at Boston, (Roxbury,) in the county of Suffolk and State of Massachusetts, have invented certain new and useful Improvements in Traction-Wheels, of which the following is a full, clear, and exact description.

This invention relates to traction-wheels for vehicles, the object being to provide a wheel with devices whereby the grip between it and the road or surface upon which it is rolling, or what is termed the "traction" power, may be increased at will. It is common to provide the periphery of wheels with spurs or projections which sink into the earth and prevent skidding of the wheels; but such devices are not always desirable, and when not they become obstructions and consume the hauling power.

My invention comprehends the use of spurs which may be thrown into operation whenever desired, and when not required for use are automatically thrown out of operation and thus do not become obstructions.

The invention will be described in detail with reference to the accompanying drawings, in which—

Figure 1 represents a vertical section through the center of a pair of wheels upon which a vehicle-body is mounted, and Fig. 2 a detail.

The wheels are represented by A A, the rims by $a$, the hubs by $b$, and the spokes by $c$. Each spoke is provided with an axial passage $c'$, ending at a point near the hub and extending through the rim and tire. At the inner end of the passage a slot $c^2$ is formed in the side of the spoke communicating with the passage. In these passages are placed rods $c^3$, the ends of which may project through the rim and tire and the inner ends provided with a right-angled projection or toe $c^4$, which passes through the slot $c^2$ and projects a short distance, as shown. These rods are loosely disposed in the passages and are free to reciprocate therein.

Upon the wagon-body are pivoted two pressure-levers $d$ and $d'$, the pivots being located in suitable brackets $d^2$, fixed to the axle. These levers are provided on their outer ends with shoes $d^3$, and they are so shaped that the shoes may stand vertically beneath the respective hubs and immediately above the projecting angular ends $c^4$ of the rods in the spokes. The shoe should be wide enough to cover two or three of the ends $c^4$ at once. The opposite ends of the two pressure-levers approach each other and are attached to a common cord or chain $e$, leading first vertically and then over suitable guide-pulleys to a point within reach from the seat or platform of the vehicle.

In operation the cord is normally slack and the rods $c^3$ are subject to the action of gravity, and as they pass around the lower half of the wheel they are prevented from projecting beyond the tire by contact with the road. Thus the power required to move the load is not called upon to lift the vehicle the height of the projecting rods as if they were unyielding. When additional traction is required, the cord $e$ is pulled, thus throwing the shoes against the ends $c^4$ of the rods as they approach and while they are passing contact with the road. The rods are first thrust outward and then held in that position and so become spurs which more or less bury themselves in the road and so increase the tractive power of the wheels.

If desired, springs may be attached to the rods to withdraw them after contact with the earth is made, thus leaving the periphery of the wheel smooth, so that a brake-shoe may be applied. The brake, however, may be applied to the top of the wheel, in which case gravity would withdraw the rods and the springs could be dispensed with.

Having thus described my invention, I claim—

1. The combination of a wheel, a rod loosely located in a longitudinal passage of each spoke and adapted to project through the rim and tire, each rod having a right-angled projection at its inner end and extending through a slot in the side of the spoke, a pressure-lever carrying a shoe that is located beneath the hub and above the right-angled projections of the rods said lever and shoe being entirely independent of the wheel and means for throwing said shoe against the said ends of the rods, substantially as described.

2. The combination of a wheel, a rod loosely located in a longitudinal passage of each spoke and adapted to project through the rim and tire, each rod having a right-angled projection at its inner end extending through a slot in the side of the spoke, a pivoted pressure-lever carrying a shoe that is located beneath the hub and above the right-angled projections of the rods and a cord attached to the lever and leading to the operator's platform, substantially as described.

In testimony whereof I subscribe my signature in presence of two witnesses.

DANIEL LAWRENCE REAGAN.

Witnesses:
WALTER L. CHERRINGTON,
WALLACE R. CHASE.